United States Patent Office 2,828,315
Patented Mar. 25, 1958

---

2,828,315

PROCAINE SALT OF PYRIDOXAL PHOSPHATE AND PROCESS

Andrew N. Wilson, Colonia, N. J., assignor to Merck & Co., Inc., Rahway, N. J., a corporation of New Jersey No Drawing. Application January 16, 1957
Serial No. 634,412

3 Claims. (Cl. 260—297)

This invention is directed to the mono-procaine salt of pyridoxal phosphate.

Pyridoxal phosphate, also known as codecarboxylase has the chemical structure:

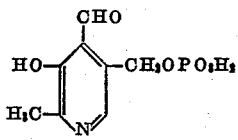

It is well established as the coenzyme of amino acid decarboxylation and of transamination. It participates also in other enzymatic reactions and possesses essentially full vitamin $B_6$ activity. Pyridoxal phosphate itself, however, is difficult to purify and loses biological activity in a very short time when exposed to light.

It is an object of the present invention to prepare a new crystalline salt of pyridoxal phosphate which has the full biological activity of the parent compound. It is a further object to provide a crystalline salt having a high degree of stability. It is a more specific object to provide the procaine salt of pyridoxal phosphate as well as a method for making this salt.

This new salt of pyridoxal phosphate has the following structural formula:

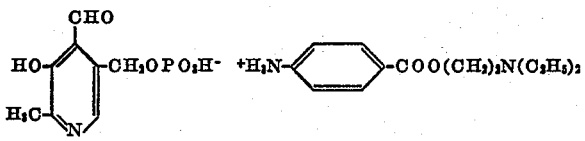

It is prepared by reacting together equimolar amounts of pyridoxal phosphate and procaine in a suitable solvent medium. The procaine is ordinarily charged to the reaction as the free base. It will, of course, be realized by those skilled in the art that a procaine salt, such as the hydrochloride, may be employed and the free base generated prior to reaction with the pyridoxal phosphate. As the solvent medium, we prefer to employ an aqueous alkanol such as aqueous methanol, ethanol or isopropanol. The salt forming reaction is allowed to proceed at temperatures of about 0 to 100° C., but for best results it is carried out in the neighborhood of 5 to 10° C. The pyridoxal phosphate procaine salt is substantially insoluble in the cold reaction medium and is conveniently isolated by filtration. It may be purified by recrystallization from aqueous methanol.

This new procaine salt has the full biological activity of pyridoxal phosphate with the added virtues of excellent stability and crystallinity.

The following example is given for the purpose of illustration and not by way of limitation:

*Example*

100 mg. of pyridoxal phosphate is dissolved in 3 ml. of water. 96 mg. of procaine dissolved in 3 ml. of ethanol is added to the solution. The reaction mixture is chilled for several days in the refrigerator, after which time the precipitated procaine salt of pyridoxal phosphate is isolated by filtration. 120 mg. of salt is obtained. After recrystallizing twice, from 50% ethanol, the salt is obtained in substantially pure form, melting point 150° C. (dec.), $\lambda_{Max.}^{0.1 N\ NaOH}$ 2750 A. ($\epsilon$ 16,000) and 3900 A. ($\epsilon$ 6,800)

*Analysis.*—Calcd. for $C_{21}H_{30}N_3O_8P$: C, 52.17; H, 6.26; N, 8.69; P, 6.41. Found: C, 51.72; H, 6.32; N, 8.81; P, 6.24.

Any departure from the above description which conforms to the present invention is intended to be included with the scope of the claims.

What is claimed is:

1. A composition having the formula:

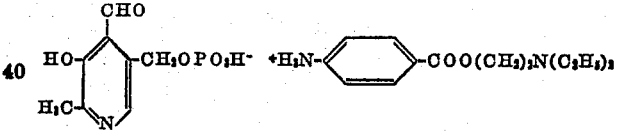

2. The process for preparing the procaine salt of pyridoxal phosphate which comprises reacting together procaine and pyridoxal phosphate.

3. The process which comprises reacting together procaine and pyridoxal phosphate in an aqueous alcoholic solvent medium and recovering the procaine salt of pyridoxal phosphate.

No references cited.